No. 732,582. PATENTED JUNE 30, 1903.
W. G. McKAY.
HOSE ATTACHMENT.
APPLICATION FILED NOV. 10, 1902.
NO MODEL.
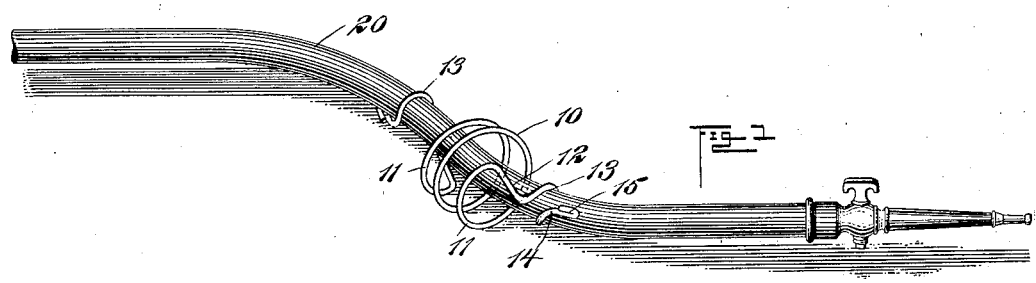
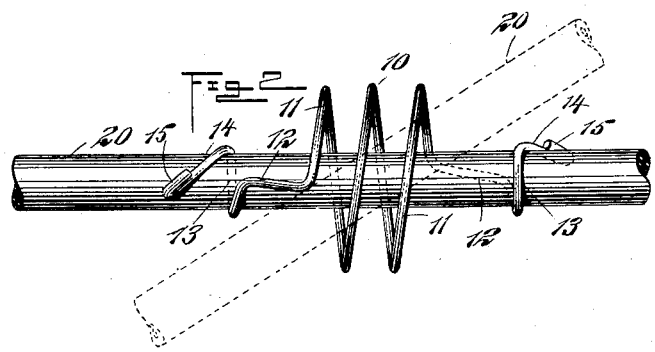
WITNESSES:
INVENTOR
Walter G. McKay.
BY
ATTORNEYS.

No. 732,582. Patented June 30, 1903.

UNITED STATES PATENT OFFICE.

WALTER G. McKAY, OF LEADVILLE, COLORADO.

HOSE ATTACHMENT.

SPECIFICATION forming part of Letters Patent No. 732,582, dated June 30, 1903.

Application filed November 10, 1902. Serial No. 130,701. (No model.)

*To all whom it may concern:*

Be it known that I, WALTER G. McKAY, a citizen of the United States, and a resident of Leadville, in the county of Lake and State of Colorado, have invented a new and Improved Hose Attachment, of which the following is a full, clear, and exact description.

In using hose, especially in the washing of floors, the water and dirt collect around the hose and are dragged with the latter over the cleaned portion of the floor, thus making much unnecessary work. To prevent this collecting of water and dirt around the hose and to enable the hose to be moved with greater ease, I provide an attachable support, any number of which may readily be applied to the hose to raise it from the floor or from the ground in case the hose is used on a lawn or the like. The attachment also prevents splinters or the like from injuring the hose and enables the latter to dry more quickly, thus tending to preserve it.

The invention will be particularly described hereinafter and then defined in the claims.

Reference is to be had to the accompanying drawings, forming a part of this specification, in which similar characters of reference indicate corresponding parts in both figures.

Figure 1 is a perspective view showing my improved attachment applied, and Fig. 2 is a plan view on a slightly-larger scale.

The attachment is preferably made of wire which is coiled several times to form a cage-like body 10, through which the hose 20 may be freely passed. The ends of the wire extend in opposite directions and are given such a form as will produce a spring-clamp at each end adapted to embrace the hose tightly and maintain the hose centrally in the body 10, which body is of greater diameter than the clamp and hose. The clamp in the specific form shown to illustrate my invention is formed by bending the wire adjacent to each end coil 11 of the body in a direction toward the axial line of the attachment and longitudinally, as at 12, and then bent circularly to form an open loop 13, which has a spring action adapted to clamp the hose. The loops 13 open at opposite sides, as seen in Fig. 2. For convenience in attaching and detaching the device the free ends of the wire are return-bent in a diagonal direction, as at 14, and the extreme end is re-turned on itself, as at 15, to afford a bearing-surface against which one's fingers may be pressed to open the loops 13 to permit entrance and removal of the hose.

In applying the attachment the body 10 is slipped onto the hose and the latter is brought to a position which is in general diagonal to the longitudinal axis of the attachment, as indicated by dotted lines in Fig. 2, and from this position the hose may readily be successively entered into the clamps 13. Thus the attachment will support the hose from the floor, as in Fig. 2, as the clamps are located approximately central to the cage-like body 10.

Having thus described my invention, I claim as new and desire to secure by Letters Patent—

1. A hose-support comprising a hollow, annular body adapted to receive a hose longitudinally and to surround said hose, and means for clamping the support to the hose, said means being located approximately in line with longitudinal axis of the body and adjacent to the latter.

2. A hose-support comprising a hollow, annular body adapted to receive and surround a hose, and a clamp at each end of said body.

3. A hose-support comprising a body formed of coiled wire, and end clamps joining the end coils of the body, and consisting of open spring-loops.

4. A hose-support comprising a body formed of coiled wire, and end clamps joining the end coils of the body and consisting of open spring-loops, the free end of each loop having an extension to facilitate spreading of the loops.

5. A hose-support comprising a body formed of coiled wire, and end clamps joining the end coils of the body and consisting of open spring-loops, the free end of each loop having an extension to facilitate spreading of the loops, the said extension ranging diagonally to the longitudinal axis of the support.

6. A hose-support comprising a body formed of coiled wire, and end clamps joining the end coils of the body and consisting of open spring-loops, the free end of each loop having an extension to facilitate spreading of the loops, the said extension ranging diagonally to the longitudinal axis of the support and having the extreme end re-turned on itself.

7. A hose-support comprising a hollow, annular body through which the hose may be passed and clamping means integral with the body, adjacent thereto and approximately in line with the longitudinal axis of the body.

In testimony whereof I have signed my name to this specification in the presence of two subscribing witnesses.

WALTER G. McKAY.

Witnesses:
ELIAS F. CREIGHTON,
JAMES F. FERRY.